United States Patent
Takeda (10) Patent No.: US 9,047,535 B2
(45) Date of Patent: Jun. 2, 2015

(54) IMAGE PROCESSING APPARATUS, IMAGE PROCESSING METHOD, AND COMPUTER READABLE MEDIUM

(75) Inventor: Junichi Takeda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 146 days.

(21) Appl. No.: 13/366,873

(22) Filed: Feb. 6, 2012

(65) Prior Publication Data

US 2013/0022278 A1 Jan. 24, 2013

(30) Foreign Application Priority Data

Jul. 19, 2011 (JP) .................................. 2011-157636

(51) Int. Cl.
*G06K 9/68* (2006.01)
*G06K 9/40* (2006.01)
*G06T 5/00* (2006.01)

(52) U.S. Cl.
CPC . *G06K 9/40* (2013.01); *G06T 5/002* (2013.01); *G06K 2209/01* (2013.01); *G06T 2207/10008* (2013.01); *G06T 2207/30176* (2013.01)

(58) Field of Classification Search
CPC ...... G06K 9/40; G06K 2209/01; G06T 6/002; G06T 227/10008
USPC .................................. 382/209, 218, 173–180
See application file for complete search history.

(56) References Cited

U.S. PATENT DOCUMENTS

| | | | | |
|---|---|---|---|---|
| 5,943,443 | A | * | 8/1999 | Itonori et al. .................. 382/225 |
| 2009/0190182 | A1 | * | 7/2009 | Ishikawa et al. ............. 358/3.28 |

FOREIGN PATENT DOCUMENTS

| | | | |
|---|---|---|---|
| JP | 05-135204 | A | 6/1993 |
| JP | 11-331606 | A | 11/1999 |
| JP | 2000-293630 | A | 10/2000 |
| JP | 2004-139428 | A | 5/2004 |
| JP | 2006-106903 | A | 4/2006 |
| JP | 2008-117126 | A | 5/2008 |
| JP | 2010-244472 | A | 10/2010 |

OTHER PUBLICATIONS

English Translation of communication dated Feb. 10, 2015, issued by the Japanese Patent Office in counterpart Application No. 2011-157636.

* cited by examiner

*Primary Examiner* — Ruiping Li
(74) *Attorney, Agent, or Firm* — Sughrue Mion, PLLC (57) ABSTRACT

An image processing apparatus includes an image retrieving unit that retrieves an image including a symbol, a noise detecting unit that detects noise of the image, a comparative image retrieving unit that retrieves a comparative image that is to be compared with a detection region of the image detected as the noise by the noise detecting unit, and a removing unit that, in accordance with comparison results of the detection region with the comparative image, removes from the image one portion of the detection region excluding the other portion of the detection region where at least part of the symbol included in the image is detected as the noise.

13 Claims, 10 Drawing Sheets

| DICTIONARY DATA ||||
|---|---|---|---|
| LANGUAGE TYPE | SIZE | COMPARATIVE IMAGE | POSITION |
| ENGLISH | 10 pt |  ~70 | LOWER |
| | |  ~70 | LOWER |
| | |  ~70 | MIDDLE |
| | | ⋮ | ⋮ |
| JAPANESE | 8 pt |  ~70 | LOWER |
| | |  ~70 | LOWER |
| | | ⋮ | ⋮ |

IMAGE PROCESSING APPARATUS, IMAGE PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-157636 filed Jul. 19, 2011.

BACKGROUND (i) Technical Field

The present invention relates to an image processing apparatus, an image processing method, and a computer readable medium.

(ii) Related Art

Noise is typically removed from an image including symbols such as characters.

SUMMARY

According to an aspect of the invention, there is provided an image processing apparatus. The image processing apparatus includes an image retrieving unit that retrieves an image including a symbol, a noise detecting unit that detects noise of the image, a comparative image retrieving unit that retrieves a comparative image that is to be compared with a detection region of the image detected as the noise by the noise detecting unit, and a removing unit that, in accordance with comparison results of the detection region with the comparative image, removes from the image one portion of the detection region excluding the other portion of the detection region where at least part of the symbol included in the image is detected as the noise.

BRIEF DESCRIPTION OF THE DRAWINGS

Exemplary embodiments of the present invention will be described in detail based on the following figures, wherein.

DETAILED DESCRIPTION

First Exemplary Embodiment

The exemplary embodiments of the invention are described below with reference to the drawings.

Figure 1:
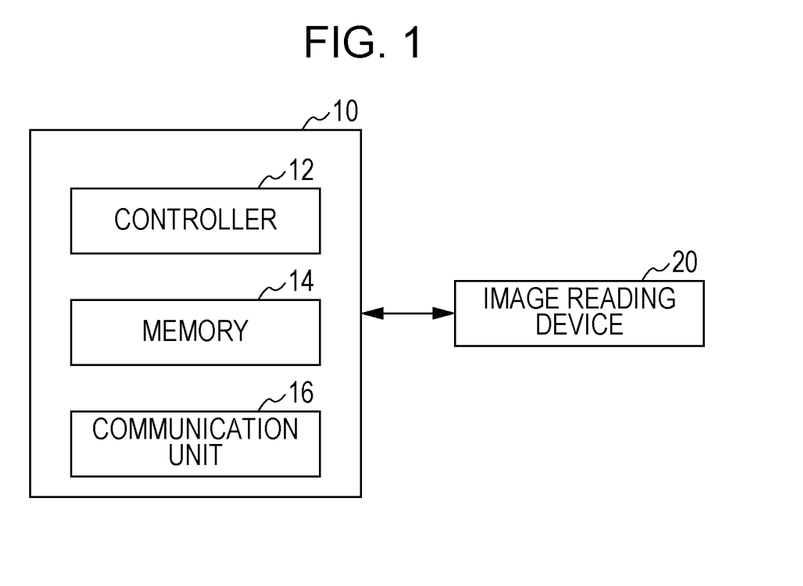
FIG. 1 illustrates a hardware configuration of an image processing apparatus of an exemplary embodiment of the invention.

FIG. 1 illustrates a hardware configuration of an image processing apparatus 10 of a first exemplary embodiment of the invention. As illustrated in FIG. 1, the image processing apparatus 10 includes controller 12, memory 14, and communication unit 16. The image processing apparatus 10 may be implemented using a personal computer, for example. The image processing apparatus 10 may further include an operation unit, and a display unit in addition to the elements of FIG. 1.

The controller 12 may include a central processing unit (CPU). The controller 12 executes a program stored on the memory 14, thereby controlling each element in the image processing apparatus 10.

The memory 14 includes a variety of memories such as a hard disk, or a random-access memory (RAM). The memory 14 is a storage medium storing the program to be executed by the controller 12. The memory 14 may be used as a working memory of the controller 12. The memory 14 may be implemented using a variety of memories. For example, the memory 14 may be implemented using a semiconductor memory.

The communication unit 16 performs a data communication with an external device connected to the image processing apparatus 10. The program and a variety of data to be stored on the memory 14 of the first exemplary embodiment may be retrieved from the external device via the communication unit 16.

According to the first exemplary embodiment, the image processing apparatus 10 is connected to an image reading device 20 via the communication unit 16 for data communication. The image reading device 20 may include a scanner. By optically scanning a scan target such as a paper document, the image reading device 20 generates an image of the scan target. The data representing the image acquired by the image reading device 20 are input to the image processing apparatus 10 via the communication unit 16.

Figure 2:
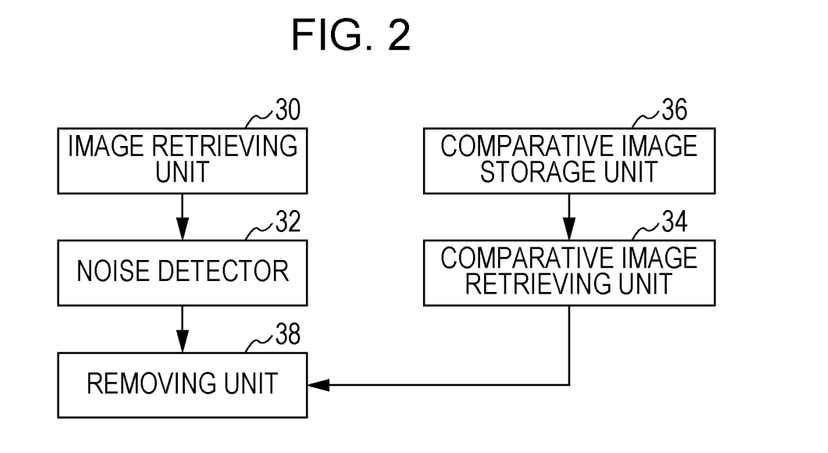
FIG. 2 is a functional block diagram of the image processing apparatus.

FIG. 2 is a functional block diagram illustrating the image processing apparatus 10. As illustrated in FIG. 2, the image processing apparatus 10 includes image retrieving unit 30, noise detector 32, comparative image retrieving unit 34, comparative image storage unit 36, and removing unit 38. Functions illustrated in FIG. 2 are executed when the controller 12 executes the program stored on the memory 14.

The image retrieving unit 30 may be implemented using the controller 12 and the communication unit 16. The image retrieving unit 30 retrieves an image including a symbol. The image includes noise on a background of a symbol. The noise may be cross-hatched noise, for example. The image may be generated by the image reading device 20 when the image reading device 20 optically reads a scan target (such as printed symbol or a hand-written recording medium). The image retrieving unit 30 retrieves from the image reading device 20 image data representing an image including a symbol (for example, data in a bitmap format).

Figure 3:
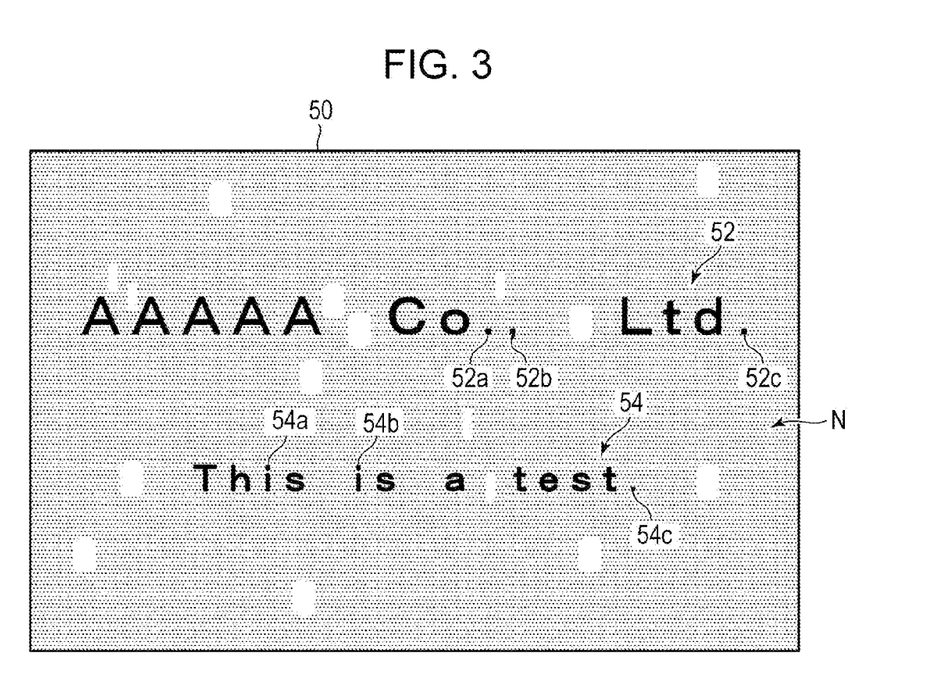
FIG. 3 illustrates an example of an image including symbols.

FIG. 3 illustrates an example of the image including symbols. As illustrated in FIG. 3, an image 50 includes symbol strings 52 and 54 formed in a scan target, and noise N on the background of the symbol strings 52 and 54. In the first exemplary embodiment, the "symbols" include characters (such as alphabets and Kanji-characters), and punctuation marks, and serve as an element in a word and a sentence. The noise N may be cross-hatched noise present on a region (a region of the background) other than a region of the symbol strings 52 and 54. In other words, the image 50 includes the symbol strings 52 and 54 and the cross-hatched noise N present around the symbol strings 52 and 54.

The noise detector 32 is implemented using the controller 12. The noise detector 32 detects the noise in the image 50. More specifically, the noise detector 32 detects the noise in the image 50 by performing a noise detection process for detecting noise having a predetermined shape (for example, a noise detection process for detecting a cross-hatched noise). The noise detection process performed by the noise detector 32 may be any of a variety of noise detection processes of related art.

According to the first exemplary embodiment, the noise detector 32 detects the noise in the image 50 through a labeling process. In the labeling process, the same label is attached to concatenated pixels such that multiple regions are sorted as a group. For example, the noise detector 32 detects the noise in the image 50 in accordance with a frequency distribution of label sizes (i.e., sizes of multiple regions) generated through the labeling process.

The noise detector 32 detects as noise an element (pixel) having a label size equal to or smaller than a threshold value determined in accordance with the frequency distribution of the label sizes. For example, the noise detector 32 detects the noise in the image 50 by performing one of the three noise detection methods described below.

First Method

Figure 4:
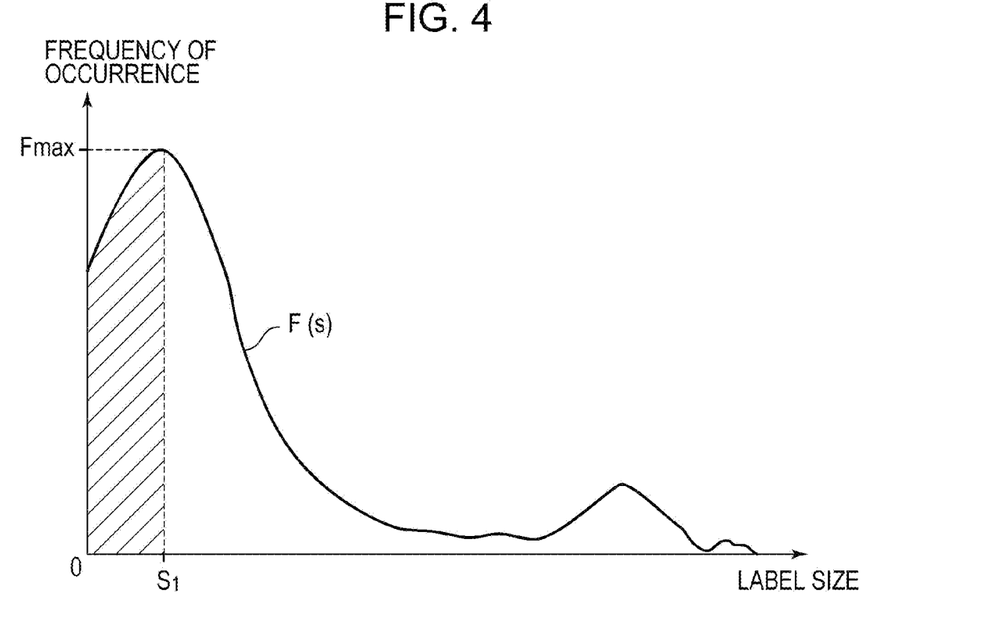
FIG. 4 illustrates a first method of detecting noise in the image.

FIG. 4 illustrates how the noise in the image 50 is detected in accordance with a first method. As illustrated in FIG. 4, a frequency distribution curve F(s) generated through the labeling process is referenced to identify a label size $S_1$ at the maximum frequency $F_{max}$. Through the first method, an element having a label size equal to or smaller than the label size $S_1$ at the maximum frequency $F_{max}$ is detected as noise.

Second Method

Figure 5:
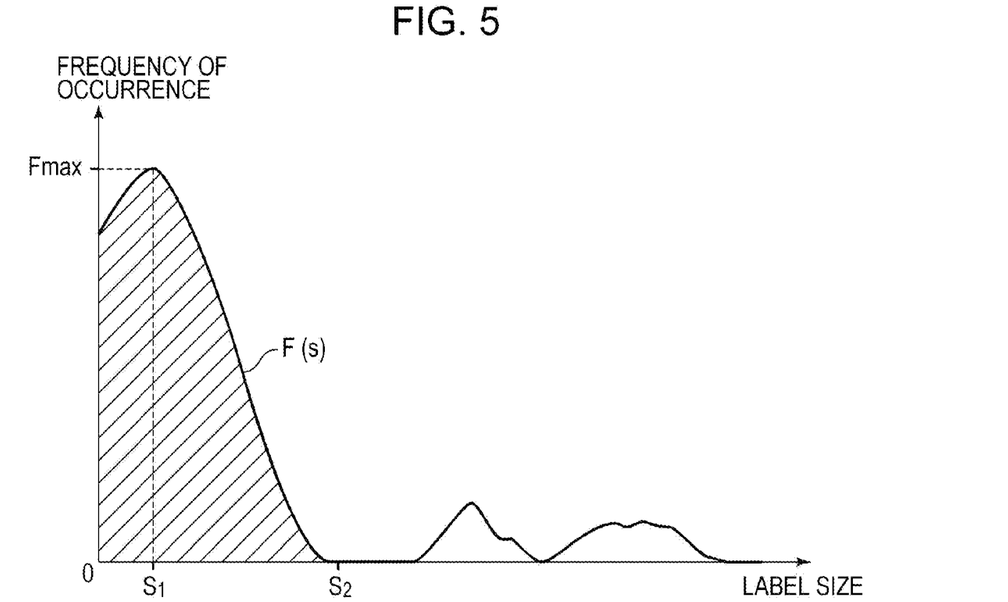
FIG. 5 illustrates a second method of detecting noise in the image.

FIG. 5 illustrates how the noise in the image 50 is detected through a second method. As illustrated in FIG. 5, a frequency distribution curve F(s) generated through the labeling process is referenced. An element having a label size equal to or smaller than $S_2$ is detected as noise. The label size $S_2$ is equal to or larger than $S_1$ at the maximum frequency $F_{max}$ (but is the smallest label size among those having a frequency of zero).

Third Method

Figure 6:
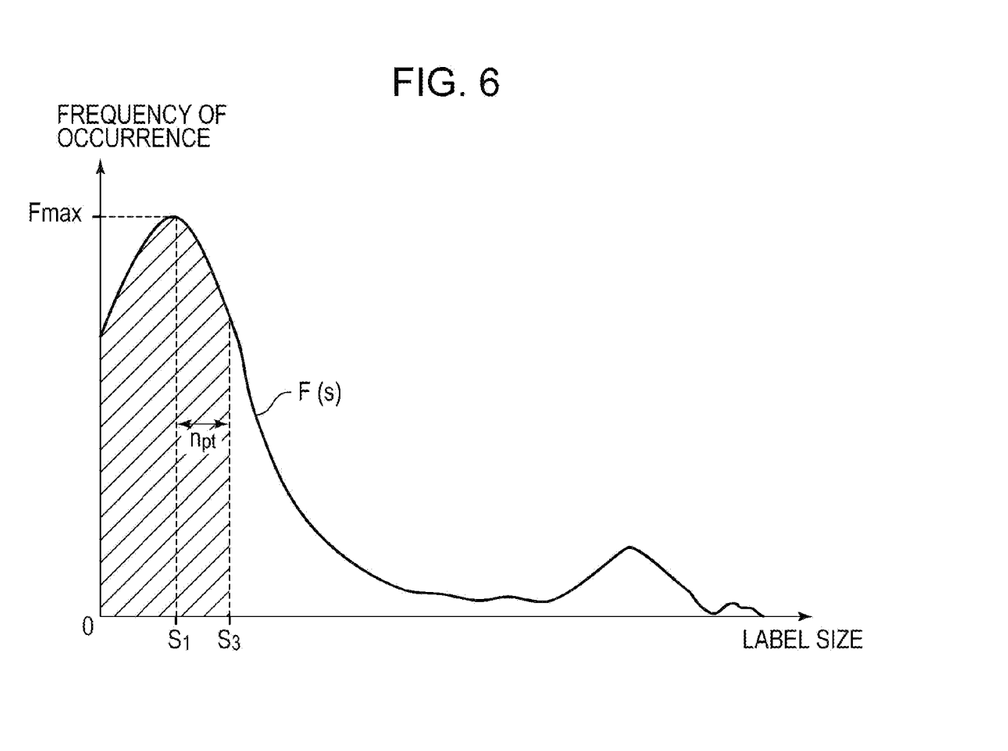
FIG. 6 illustrates a third method of detecting noise in the image.

FIG. 6 illustrates how the noise in the image 50 is detected through a third method. As illustrated in FIG. 6, a frequency distribution curve F(s) generated through the labeling process is referenced. An element having a label size equal to or smaller than a threshold value determined based on the label size $S_1$ at the maximum frequency $F_{max}$ is detected as noise. (The threshold value may be a label size S3 that is smaller or larger than the label size $S_1$ by a predetermined size.)

Since an element having a label size equal to or smaller than the threshold value is detected as noise, a portion of the symbol strings 52 and 54 is also detected as a background portion noise in addition to the noise N. For example, symbols such as ". (period)," or ", (comma)," and "• (dot)" of the letters "i" and "j" are also detected as noises. For example, one of the elements of the symbol strings 52 and 54 (at least part of a symbol) is similar to the shape of the noise N as a detection target and is thus detected as noise.

The one of the elements of the symbol strings 52 and 54 detected as noise is referred to as a "small symbol element." In the image 50 of FIG. 3, small symbol elements 52a, 52b, and 52c of the symbol string 52 and small symbol elements 54a, 54b, and 54c of the symbol string 54 are detected as noises.

If one of the standard noise detection processes is performed on the image 50, the small symbol elements as well as the noise N are detected as noises. If a detection region detected as noise by the noise detector 32 (the noise N and an element corresponding to a small symbol element) is removed from the image 50, part of each of the symbol strings 52 and 54 is missing.

Figure 7:
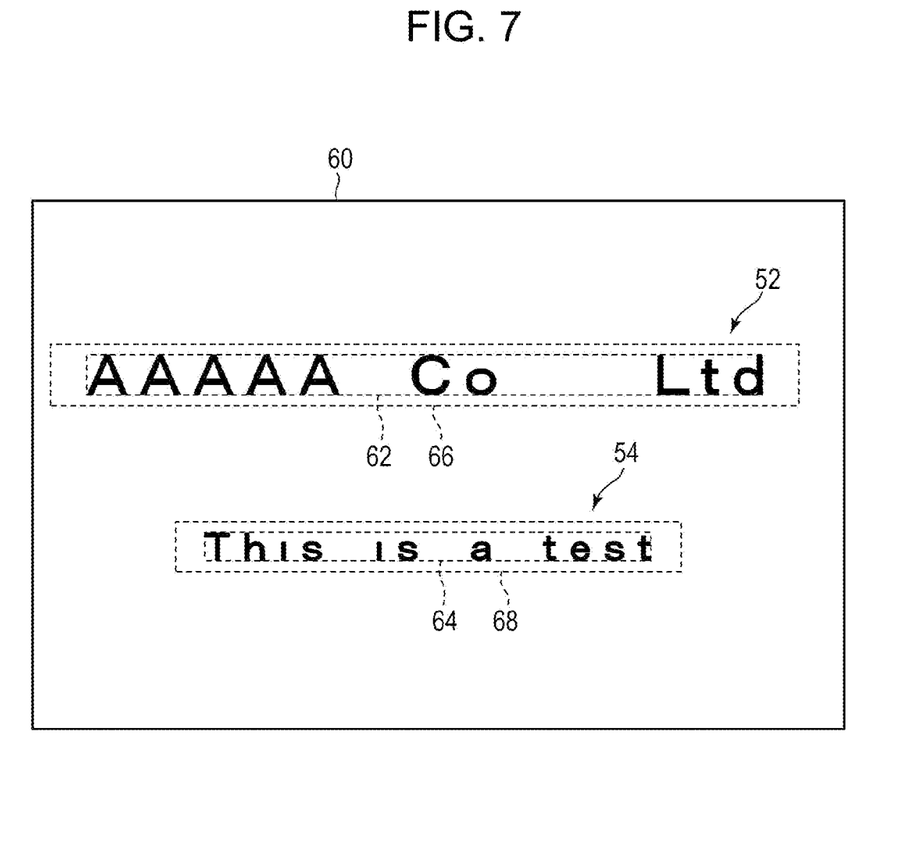
FIG. 7 illustrates an example of the image from which a detection region is removed.

FIG. 7 illustrates an example of the image 50 from which the detection regions are removed. The detection regions include the noise N and the small symbol elements. The image 50 with the detection regions removed therefrom is hereinafter referred to as a detection-region-removal image 60. The detection-region-removal image 60 is a difference image between the image 50 of FIG. 3 and the noise N and small symbol elements.

As illustrated in FIG. 7, the small symbol elements 52a, 52b, 52c, 54a, 54b, and 54c included in the symbol strings 52 and 54 are regarded as noises and are thus removed from the image 50. More specifically, if the detection regions are directly removed from the image 50, the detection-region-removal image 60 is the symbol strings 52 and 54 with part thereof missing. According to the first exemplary embodiment, the small symbol element is controlled not to be removed as noise by the removing unit 38.

The comparative image retrieving unit 34 is implemented by the controller 12. The comparative image retrieving unit 34 retrieves a comparative image that is to be compared with the detection region of the image 50 detected as noise by the noise detector 32. More specifically, the comparative image serves as an image to be compared with the detection region, and may be an image denoting a small symbol element or an image denoting noise.

According to the first exemplary embodiment, the comparative image retrieving unit 34 retrieves the comparative image denoting at least part of the symbol (i.e., a small symbol element) from the comparative image storage unit 36 storing the comparative image. The comparative image storage unit 36 may be implemented using the memory 14. According to the first exemplary embodiment, the comparative image may be considered as an image denoting a symbol that is erroneously detected as noise.

Figure 8:
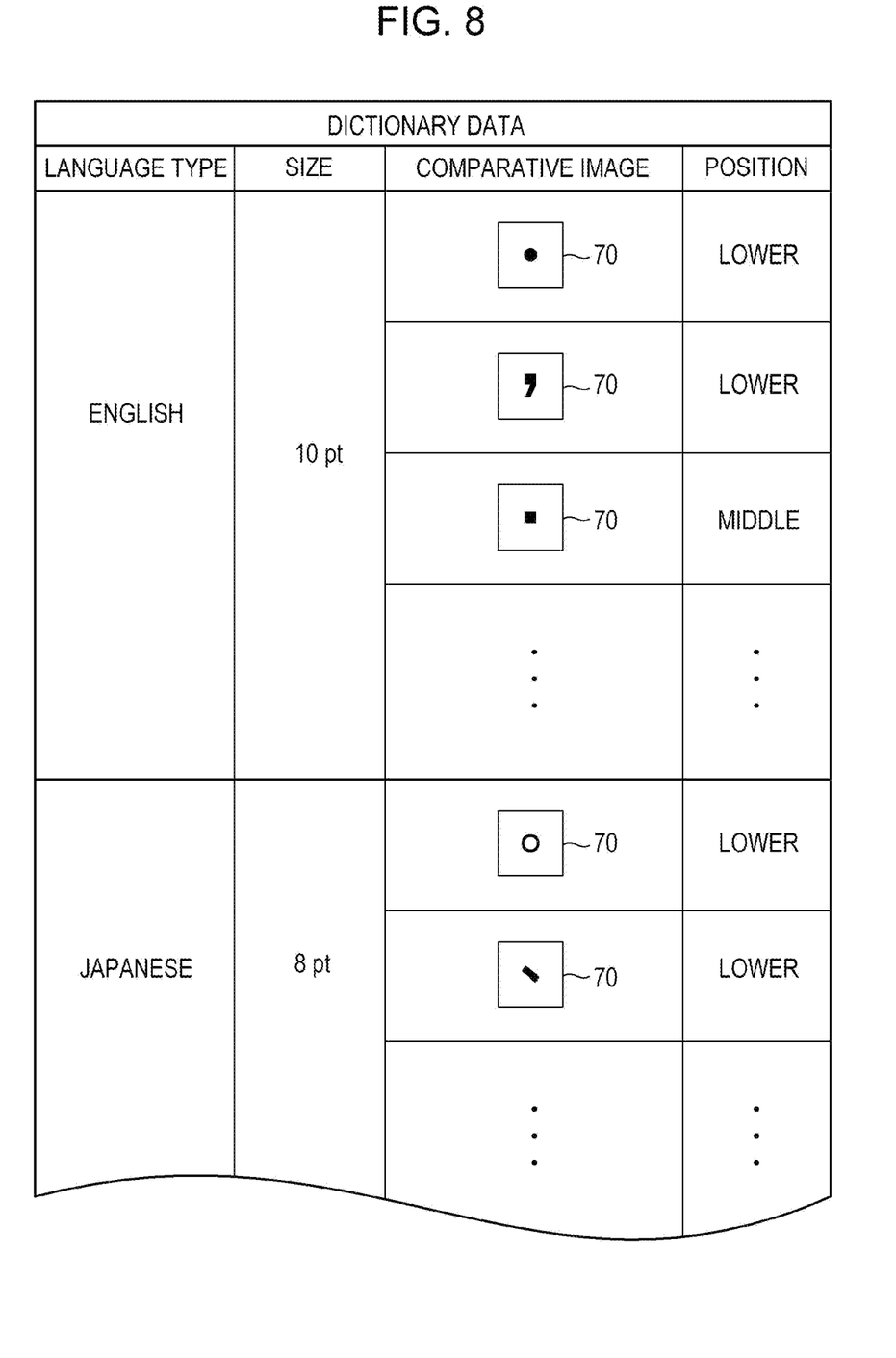
FIG. 8 illustrates an example of a storage content on a comparative image storage unit.

FIG. 8 illustrates an example of a storage content on the comparative image storage unit 36. As illustrated in FIG. 8, dictionary data including image data of comparative images 70 are stored on the comparative image storage unit 36. The dictionary data include a variety of information related to and associated with the comparative images 70.

The comparative images 70, when being stored, are associated with information indicating a language type (character system) to which a symbol represented by the comparative image belongs. Information indicating the language type may include information related to alphabet-based languages (such as English and French) having non-equal pitches between symbols and Kanji-character-based language (such as Japanese and Chinese) having equal pitches between symbols. According to the first exemplary embodiment, the language type of the symbols of the symbol strings 52 and 54 is determined based on the pitch between the symbols of the symbol strings 52 and 54 included in the image 50.

For example, if the pitch between the symbols of the symbol strings 52 and 54 is not constant, the symbols are determined as being an alphabet-based language. If the pitch between the symbols of the symbol strings 52 and 54 is constant, the symbols are determined as being a Kanji-character-based language. The determination of whether the pitch between the symbols is constant or not may be made depending on whether deviations (variations) in the pitch between the symbols included in the symbol strings 52 and 54 are equal to or above a reference value.

The comparative images 70, when being stored, are associated with information related to the size of a symbol denoted by the comparative images 70. The information related to the size of the symbol may include information indicating a font size of a small symbol element and information indicating the height level of the small symbol element.

The comparative images 70, when being stored, are associated with information indicating a positional relationship between a position of the detection region and a position of the symbol included in the image 50. The information indicating the positional relationship may indicate a positional relationship between a symbol surrounding a detection region (for example, a symbol adjacent to the detection region) and the detection region.

The storage content on the comparative image storage unit 36 is not limited to the above-described examples. For example, the comparative images 70, when being stored, may be associated with information indicating a font type of the small symbol element.

The removing unit 38 may be implemented using the controller 12. Based on the comparison results of the detection region (the noise N and the small symbol elements) with the comparative images 70, the removing unit 38 removes from the image a portion of the detection region (for example, a pixel of the noise N) excluding another portion of the detection region (for example, a pixel of the small symbol element) where at least part of the symbol included in the image 50 (for example, the symbols of the symbol strings 52 and 54) is detected as noise.

The removing unit 38 perform a pattern matching operation between the detection region and the comparative image 70, thereby determining whether the detection region is similar to the comparative image 70. The removing unit 38 thus determines whether the detection region is the noise N or the small symbol element. By performing the pattern matching operation, the removing unit 38 extracts the small symbol element from the detection region, and restricts the removal of the small symbol element.

According to the first exemplary embodiment, the removing unit 38 removes from the image 50 the detection region excluding a portion of the detection region similar to the comparative image 70. More specifically, the removing unit 38 removes from the image 50 a portion of the detection region not similar to the comparative image 70.

The removing unit 38 calculates a similarity between the detection region and the comparative image 70 by comparing the detection region with the comparative image 70. The similarity is a measure by which two images are similar to each other. For example, the similarity is calculated by determining differences between pixel values of the pixels of the two images. The removing unit 38 determines whether the two images are similar to each other by determining whether the similarity falls within a reference range (for example, whether the similarity is equal to or higher than a reference value).

If the similarity between the detection region and the comparative image 70 falls within the reference range in the first exemplary embodiment, the detection region is similar to the small symbol element indicated by the comparative image 70, and is thus determined as being the small symbol element. If the similarity between the detection region and the comparative image 70 is outside the reference range, the detection region is not similar to the small symbol element indicated by the comparative image 70, and is thus determined as being the noise N.

According to the first exemplary embodiment, the removing unit 38 compares the detection region with the comparative image 70 associated with the language type of the symbol included in the image 50. For example, the removing unit 38 detects the pitch of the symbols (the symbols of the symbol strings 52 and 54) included, in the image 50, thereby identifying the language type of the symbol.

More specifically, the symbol detection process is performed on the detection-region-removal image 60 of FIG. 7 to detect symbol regions 62 and 64 in a rectangular shape, corresponding to the symbol strings 52 and 54. The pitches of the symbols included in the symbol regions 62 and 64 are detected. For example, the pixel pitches of the symbols are acquired to detect the pitches of the symbols. The language type of the symbols is identified depending on whether the pitch of the symbols falls within the predetermined range. The comparative image 70 associated with the identified language type becomes a target of the pattern matching operation with the detection region.

According to the first exemplary embodiment, the removing unit 38 compares the detection region with the comparative image 70 that is modified in size in response to the size of the symbols included in the image. For example, by referencing the heights of the symbol regions 62 and 64, line heights of the symbol strings 52 and 54 are identified. The size of the comparative image 70 is modified to match the size of the symbols indicated by the line heights. The pattern matching operation is then performed.

According to the first exemplary embodiment, the removing unit 38 compares the detection region with the comparative image 70 associated with the positional relationship between the position of the detection region and the position of the symbol included in the image 50. For example, the removing unit 38 compares the detection region with the comparative image 70 that is associated with the positional relationship between the position of the detection region included in the symbol regions 62 and 64 and the symbol around the detection region (for example, the symbol adjacent to the detection region). According to the first exemplary embodiment, only the comparative image 70 associated with the position of the detection region out of the comparative images 70 stored on the comparative image storage unit 36 serves as a target of the pattern matching operation.

According to the first exemplary embodiment, the removing unit 38 compares a portion of the detection region corresponding to the symbol included in the image with the comparative image 70. Only detection regions in expansion regions 66 and 68 expanded in response to the size of the symbol regions 62 and 64 serve as a target of pattern matching. The expansion regions 66 and 68 respectively include the symbol regions 62 and 64.

A portion of the detection region similar to the comparative image 70 is determined as being the small symbol element, and is prevented from being removed from the image 50. In other words, the removing unit 38 generates an image that results from removing only the noise N from the image 50.

Figure 9:
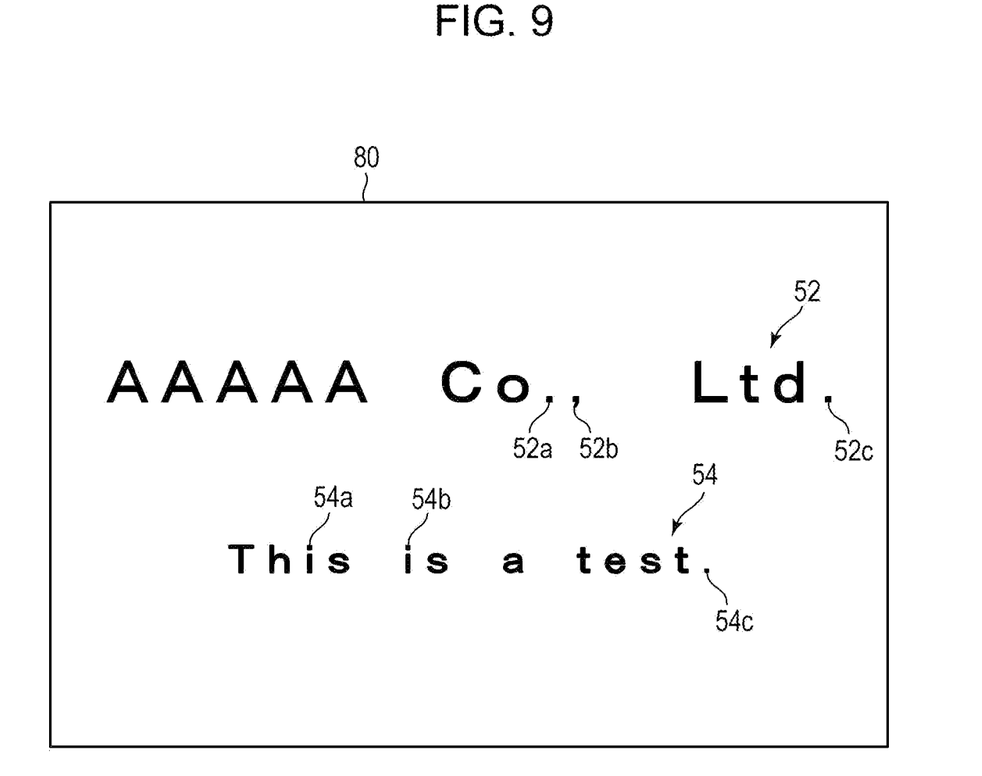
FIG. 9 illustrates an example of an image generated by a removing unit.

FIG. 9 illustrates an example of the image generated by the removing unit 38. As illustrated in FIG. 9, the image generated by the removing unit 38 (hereinafter referred to as a noise-removal image 80) is a difference image between the comparative image 70 of FIG. 3 and the noise N. In comparison with the detection-region-removal image 60 (see FIG. 7), the noise-removal image 80 includes the small symbol elements 52a, 52b, 52c, 54a, 54b, and 54c. The symbol strings 52 and 54 are without any missing portion and only the noise N is removed from the image 50.

Figure 10:
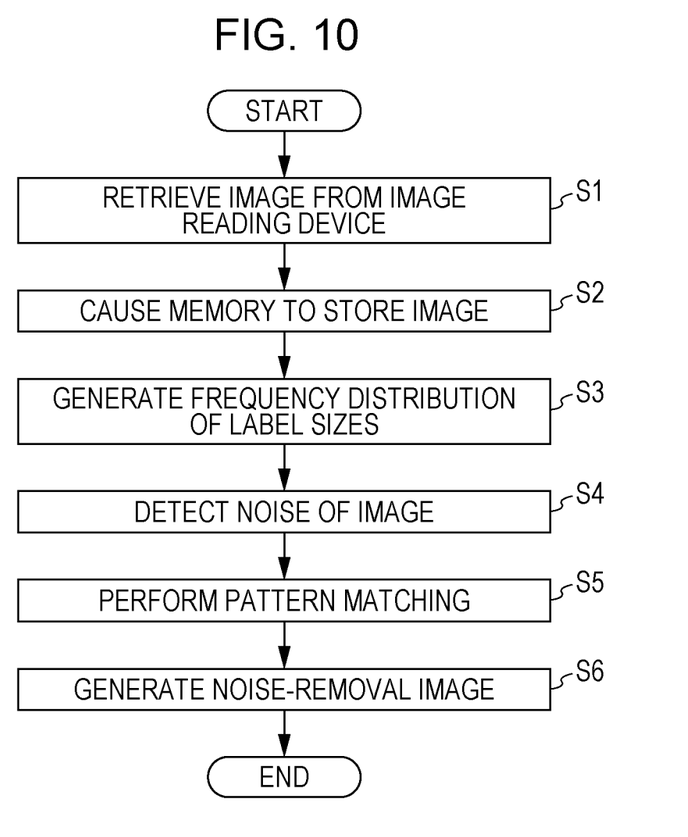
FIG. 10 is a flowchart illustrating a process performed by the image processing apparatus.

FIG. 10 is a flowchart illustrating a process executed by the image processing apparatus 10. The controller 12 performs the process of FIG. 10 by executing the program stored on the memory 14.

As illustrated in FIG. 10, the controller 12 retrieves the image 50 from the image reading device 20 (S1). If the image 50 is not received from the image reading device 20, the process may be terminated.

The controller 12 causes the memory 14 to store the image 50 retrieved in S1 (S2). The controller 12 performs the labeling process on the image 50 and generates the frequency distribution of label sizes (see FIGS. 4 through 6) (S3). In S3, a label number is assigned to each pixel in the image 50. The controller 12 generates the frequency distribution of the label sizes by counting the number of pixels having the same label number. Data representing the frequency distribution of the label sizes are temporarily stored on the memory 14.

The controller 12 determines whether the label count (for example, the maximum value of the label number) is equal to or higher than a threshold value. If the label count is equal to or higher than the threshold value, processing proceeds to S4. If the label count is lower than the threshold value, the controller 12 may determine that the image 50 does not include the cross-hatched noise of FIG. 3 and then terminate the process.

The controller 12 detects the noise in the image 50 in accordance with the frequency distribution of the label sizes generated in S3 (S4). In S4, the noise is detected using one of the first through third methods described above. The data identifying the detection region detected in S4 (data indicating the position of the pixel included in the detection region) are temporarily stored on the memory 14. The determination of the small symbol element in S4 may also be understood as a detection of a noise candidate.

Figure 11:
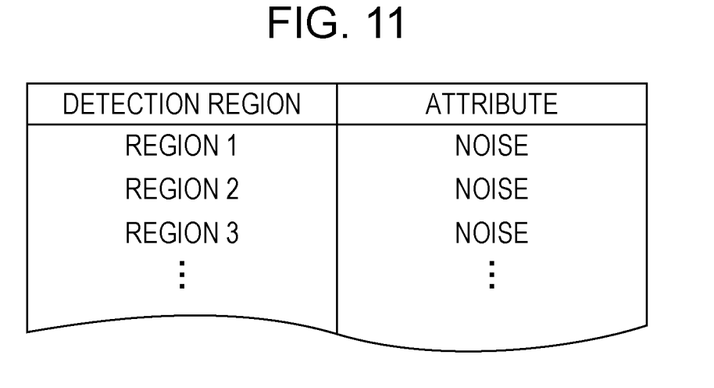
FIG. 11 illustrates an example of data identifying the detection region.

FIG. 11 illustrates an example of the data identifying the detection region. As illustrated in FIG. 11, information identifying the position of each detection region (such as coordinates of a pixel) and information identifying an attribute of the detection region are associated with each other when being stored. The attribute is information identifying whether the detection region is noise or a small symbol element. Optionally in S4, the controller 12 may determine that all the detection regions are the attribute of noise.

The controller 12 performs the pattern matching operation on the detection region of the image 50 and the comparative image 70 (S5).

Figure 12:
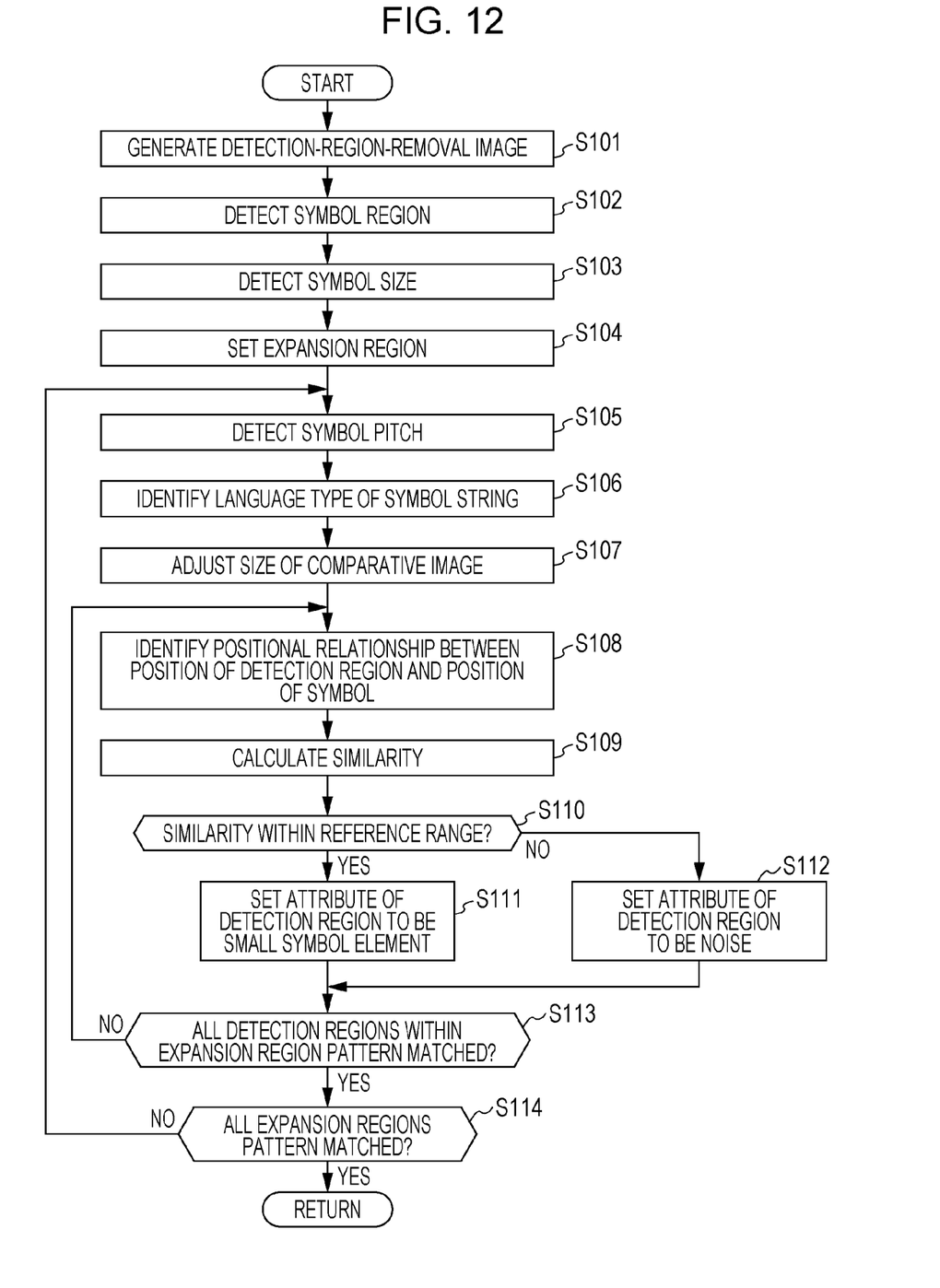
FIG. 12 illustrates an operation performed in one step of a process of a first exemplary embodiment.

FIG. 12 illustrates a process performed in the pattern matching operation in S5 of the first exemplary embodiment illustrated in FIG. 10. As illustrated in FIG. 12, the controller 12 generates the detection-region-removal image 60 by removing the detection region detected in S4 from the image 50 retrieved in S1 (S101). The detection-region-removal image 60 generated in S101 becomes the difference image with the pixel within the detection region removed from the image 50 (see FIG. 7).

The controller 12 detects the symbol regions 62 and 64 of the symbol strings 52 and 54 included in the detection-region-removal image 60 generated in S101 (S102). When the symbol detection process is performed on the detection-region-removal image 60 in S102, the pixels in the symbol strings 52 and 54 are identified and the symbol regions 62 and 64 are detected.

The controller 12 detects from the line height of the symbol regions 62 and 64 detected in S102 the size of the symbols of the symbol strings 52 and 54 (S103). For example, data associating the number of pixels indicative of the line height with the size of the symbol may be prepared. In such a case, the size associated with the number of pixels of the line height may be detected as the size of the symbol strings 52 and 54. The line height of the symbol regions 62 and 64 may be directly used as the size of the symbol.

The controller 12 sets the expansion regions 66 and 68 in the detection-region-removed image 60 (S104). The expansion regions 66 and 68 result from expanding the symbol regions 62 and 64 detected in S102 by a length responsive to the size of the symbol of the symbol string 52 detected in S103.

The pattern matching operation is performed on the detection region in the expansion regions 66 and 68 and the comparative image 70. The pattern matching operation is performed first on the detection region within the expansion region 66.

The controller 12 detects the pitch of the symbols within the expansion region 66 (S105). In other words, the pixel spacing between the pixels of the symbols in the symbol string 52 included in the expansion region 66 is acquired.

The controller 12 identifies the language type of the symbol string 52 in response to variations in the pitch of the symbols in the expansion region 66 (S106). If the value of the variations is equal to or higher than a threshold value, the language type is determined as being a sentence of an alphabet-based language. If the value of the variations is lower than the threshold value, the language type is determined as being a Kanji-character-based language.

In response to the size of the symbol string 52 identified in S103, the controller 12 adjusts the size of the comparative image 70 associated with the language type identified in S106 (S107). For example, the size of the comparative image 70 is modified in accordance with the size of the comparative image 70 and the size of the symbol strings 52 and 54.

More specifically, the comparative image 70 is expanded or contracted in size such that the comparative image 70 matches the symbol string 52 in size. For example, the size of the comparative image 70 may now be 10 points, and the size of the symbol of the symbol string 52 may be 8 points. In such a case, the comparative image 70 is contracted in size to 80%. The comparative image 70 thus adjusted in S107 is temporarily stored on RAM of the memory 14 or the like.

The controller 12 identifies the positional relationship between the position of a portion of the detection region of the expansion region 66 to be compared with the comparative image 70 and the position of the symbol around the detection region (S108). For example, the controller 12 identifies whether the detection region is positioned above or below the symbol adjacent to the detection region.

The controller 12 compares the detection region with the comparative image 70 associated with the positional relationship identified in S108 to determine a similarity therebetween (S109). The similarity calculated in S109 is temporarily stored on the memory 14. If a plurality of comparative images 70 are compared with the detection region, the similarities of the plurality of comparative images 70 are stored.

The controller 12 determines the similarity calculated in S109 falls within a reference range (S110). If the plurality of comparative images 70 are compared with the detection region in S109, the controller 12 determines whether one of the similarities falls within the reference range. For example, if one of the similarities of the comparative images 70 having undergone the pattern matching operation is within the reference range, the controller 12 determines in S110 that the similarity falls within the reference range.

If the similarity falls within the reference range (yes branch from S110), i.e., if the detection region is similar to the comparative image 70, the controller 12 determines that the attribute of the detection region is the small symbol element (S111). For example, the attribute of the detection region of the data of FIG. 11 is modified.

If the similarity falls outside the reference range (no branch from S110), i.e., if the detection region is not similar to the comparative image 70, the controller 12 determines that the attribute of the detection region is noise (S112).

The controller 12 determines whether all the detection regions within the expansion region 66 have undergone the pattern matching operation (S113). If the controller 12 determines that not all the detection regions within the expansion region 66 have undergone the pattern matching operation (no branch from S113), processing returns to S108. A next detection region within the expansion region 66 is pattern matched.

If the controller 12 determines that all the detection regions within the expansion region 66 have undergone the pattern matching operation (yes branch from S113), the controller 12 then determines whether all the expansion regions 66 and 68 have been pattern matched (S114).

If the controller 12 determines that not all the expansion regions 66 and 68 have been pattern matched (no branch from S114), processing returns to S105. For example, the expansion region 66 is pattern matched followed by the pattern matching operation of the expansion region 68. If the controller 12 determines that all the expansion regions 66 and 68 have been pattern matched (yes branch from S114), processing proceeds to S6.

Referring back to FIG. 10, the controller 12 generates the noise-removal image 80 that results from removing from the image 50 the detection region having an attribute "noise." The controller 12 then causes the memory 14 to store the noise-removal image 80 (S6), and ends the process. A detection region that is determined as being a small symbol element is controlled not to be removed from the image 50.

The image processing apparatus 10 of the first exemplary embodiment pattern-matches the detection region detected as noise against the comparative image 70 representing the small symbol element. The image processing apparatus 10 thus determines whether the detection region is noise or a small symbol element. The image processing apparatus 10 restricts the removal of the detection region determined as being the small symbol element from the image 50. The small symbol element is controlled not to be removed as noise. In other words, the image processing apparatus 10 removes from the image 50 only noise, and increases the extraction accuracy of the symbol strings 52 and 54 included in the image 50.

The image processing apparatus 10 stores the comparative image 70 representing the small symbol element, and thus beforehand defines the small symbol element that is prevented from being removed as noise.

The image processing apparatus 10 compares, with the image 50, only the comparative image 70 corresponding to the language type of the symbol included in the image 50 out of the comparative images 70 prepared beforehand. A process load involved in the pattern matching operation is reduced.

The image processing apparatus 10 modifies the size of the comparative image 70 in response to the size of the symbol of the symbol strings 52 and 54. The image processing apparatus 10 performs the pattern matching operation using the comparative image 70 having an optimum size responsive to the size of the symbol included in the image 50.

The image processing apparatus 10 compares, with the image 50, only the comparative image 70 at the position of the detection region out of the comparative images 70 prepared beforehand. The process load involved in the pattern matching operation is thus reduced.

The image processing apparatus 10 compares, with the comparative image 70, the detection region only within the expansion regions 66 and 68 in the image 50. The process load involved in the pattern matching operation is reduced.

Second Exemplary Embodiment

According to the first exemplary embodiment, the comparative image 70 indicating the small symbol element is used in the pattern matching operation. The determination method of determining whether the detection region is noise or a small symbol element may be performed through the pattern matching operation of the comparative image. The determination method is not limited to the determination method of the first exemplary embodiment. In a second exemplary embodiment, the comparative image 70 indicating noise is compared with the detection region, and a detection region not similar to the comparative image 70 is determined as being a small symbol element.

The hardware configuration of the image processing apparatus 10 of the second exemplary embodiment is identical to the hardware configuration of the first exemplary embodiment, and the discussion thereof is omitted.

Figure 13:
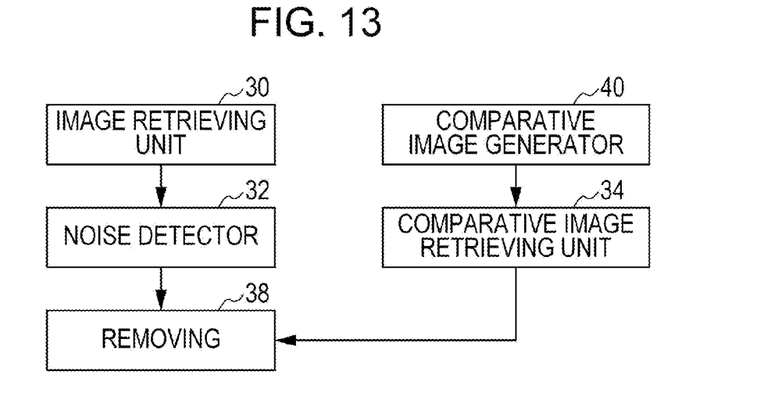
FIG. 13 is a functional block diagram of an image processing apparatus of a second exemplary embodiment.

FIG. 13 is a functional block diagram illustrating the image processing apparatus 10 of the second exemplary embodiment. As illustrated in FIG. 13, a comparative image generator 40 is included in the second exemplary embodiment.

The comparative image generator 40 generates the comparative image 70 in accordance with the detection region. The comparative image retrieving unit 34 of the second exemplary embodiment retrieves the comparative image 70 generated by the comparative image generator 40. An image including the detection region within the image 50 is used as the comparative image 70. More specifically, the comparative image 70 representing noise is generated using the image 50.

Figure 14:
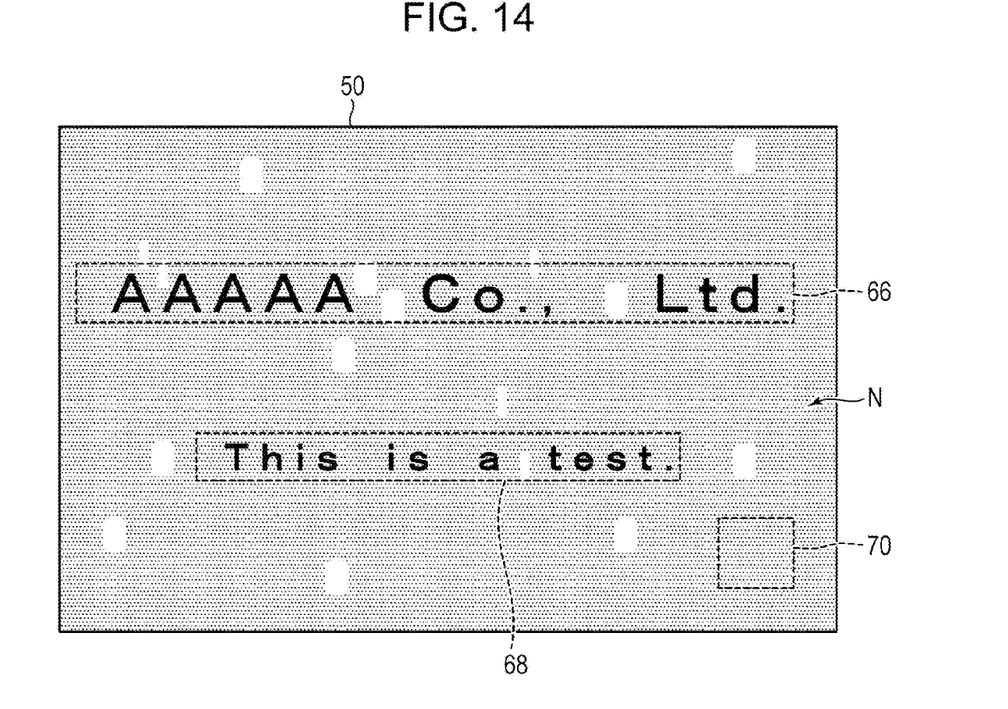
FIG. 14 illustrates a generation method of a comparative image.

FIG. 14 illustrates the generation method of the comparative image 70. A detection region within the expansion regions 66 and 68 may be a small symbol element, and a detection region outside the expansion regions 66 and 68 is used herein as a comparative image 70. By extracting the detection region outside the expansion regions 66 and 68 within the image 50, the comparative image 70 is generated.

The removing unit 38 of the second exemplary embodiment removes from the image 50 a portion of the detection region excluding another portion of the detection region not similar to the comparative image 70. More specifically, the removing unit 38 of the second exemplary embodiment removes from the image 50 the portion of the detection region similar to the comparative image 70.

The removing unit 38 calculates a similarity between the detection region and the comparative image 70 representing noise. The calculation method of the similarity is identical to the calculation method of the similarity of the first exemplary embodiment. If the similarity falls within the reference range, the detection region is similar to the comparative image 70. The detection region is thus determined as being noise. If the similarity falls outside the reference range, the detection region is not similar to the comparative image 70. The detection region is determined as being a small symbol element.

The second exemplary embodiment is identical to the first exemplary embodiment in the process of FIG. 10 other than S5.

Figure 15:
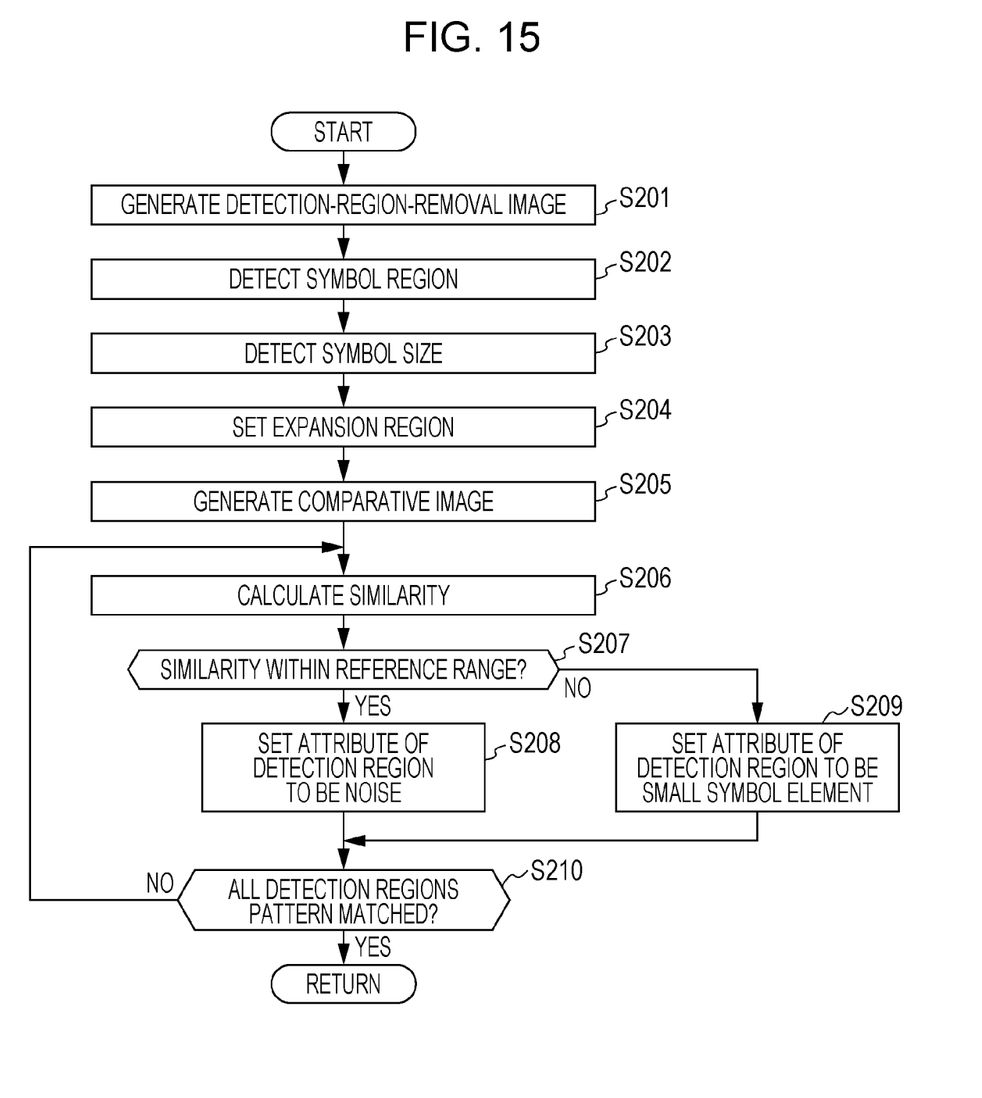
FIG. 15 illustrates an operation performed in one step of a process of the second exemplary embodiment.

FIG. 15 illustrates operations performed in S5 of the second exemplary embodiment. As illustrated in FIG. 15, S201-S204 are respectively identical to S101-S104, and the discussion thereof is omitted herein.

The controller 12 generates the comparative image 70 in accordance with the detection region outside the expansion regions 66 and 68 (S205). The comparative image 70 is generated by distracting from the image 50 a region including the detection region outside the expansion regions 66 and 68. The comparative image 70 is then stored on the memory 14.

The controller 12 retrieves the comparative image 70 generated in S204, and compares the comparative image 70 with the detection region within the expansion regions 66 and 68 to calculate the similarity between the comparative image 70 and the detection region within the expansion regions 66 and 68 (S206). The similarity calculated in S206 is temporarily stored on the memory 14.

The controller 12 determines whether the similarity calculated in S109 is within the reference range (S207). If the controller 12 determines that the similarity calculated in S109 is within the reference range (yes branch from S207), i.e., if the detection region is similar to the comparative image 70, the controller 12 determines that the attribute of the detection region is noise (S208).

If the controller 12 determines that the similarity calculated in S109 is not within the reference range (no branch from S207), i.e., the detection region is not similar to the comparative image 70, the controller 12 determines that the attribute of the detection region is a small symbol element (S209).

The controller 12 determines whether all the detection regions within the expansion regions 66 and 68 are pattern-matched (S210). If the controller 12 determines that not all the detection regions within the expansion regions 66 and 68 are pattern-matched (no branch from S210), processing returns to S206. If the controller 12 determines that all the detection regions within the expansion regions 66 and 68 are pattern-matched (yes branch from S210), processing proceeds to S6.

The image processing apparatus 10 of the second exemplary embodiment pattern-matches the detection region detected as noise against the comparative image 70 indicating noise. The image processing apparatus 10 thus determines whether the detection region is noise or a small symbol element. The image processing apparatus 10 restricts the removal of the detection region determined as being the small symbol element from the image 50. The image processing apparatus 10 thus prevents the small symbol element from being removed as noise. The image processing apparatus 10 dynamically generates the comparative image 70, thereby eliminating the need to prepare the comparative image 70 in advance.

The present invention is not limited the exemplary embodiments. The exemplary embodiments may be modified without departing the scope of the present invention.

Modifications

According to the exemplary embodiments, image data of the image 50 are retrieved from the image reading device 20 via the communication unit 16. The image 50 may be stored on the memory 14 or an external memory. In other words, the image retrieving unit 30 may retrieve the image 50 directly from a unit that stores the image 50 or a unit that generates the image 50.

According to the exemplary embodiments, the noise detector 32 detects the noise through one of the first through third methods. A different noise detection method may be used. For example, two or three of the first through third methods may be used in combination. In another method, the size of the symbol in the symbol regions 62 and 64 may be detected, and an element of a label size equal to or smaller than a threshold value determined by the size of the symbol (for example, the threshold value being 0.5 times the size of the symbol) may be detected as noise. Detected in addition to the noise as a background of the symbol strings 52 and 54 may be a noise generated through optical scanning of the image reading device 20 performed on a scan target.

According to the second exemplary embodiment, the comparative image 70 indicating noise is dynamically generated based on the image 50. The comparative image 70 indicating the noise may be stored beforehand on the memory 14. Image data defining a variety of noise patterns including cross-hatched noise may be stored on the memory 14. In this case, the comparative image retrieving unit 34 retrieves the comparative image 70 from the memory 14 storing the comparative image 70 indicating the noise.

According to the second exemplary embodiment, the image processing apparatus 10 determines whether the detection region is the small symbol element or not depending on whether the similarity between the comparative image 70 indicating noise and the detection region falls within the reference range. The image processing apparatus 10 may determine whether the detection region is the small symbol element or not using another method. The removing unit 38 may calculate the similarities between all the detection regions and the comparative image 70, and generate a distribution of similarities. Based on the distribution of similarities, the image processing apparatus 10 determines whether the detection region is the small symbol element. If the distribution has two peaks, one peak may be set to be small symbol elements and the other peak may be set to be noise.

The first exemplary embodiment and the second exemplary embodiment may be used in combination. A detection region that is determined as being a small symbol element using the determination methods of the first and second exemplary embodiments may be determined as being a small symbol element. Alternatively, a detection region that is determined as being a small symbol element using one of the determination methods of the first and second exemplary embodiments may be determined as being a small symbol element.

In the first exemplary embodiment, a detection region may have a similarity falling outside the reference range (for example, may have a similarity lower than a first threshold value). For example, if the similarity is within a different range (for example, is lower than the first threshold value but equal to or higher than a second threshold value), the method of the second exemplary embodiment may be performed on the detection region.

In the second exemplary embodiment, a detection region may have a similarity falling outside the reference range (for example, may have a similarity higher than a third threshold value). For example, if the similarity is within a different range (for example, is higher than the third threshold value but equal to or lower than a fourth threshold value), the method of the first exemplary embodiment may be performed on the detection region.

In the first exemplary embodiment, the comparative image 70 is associated with the information indicating the language type, the information related to the size of the symbol, and the information related to the positional relationship. The comparative image 70 may not be related to these pieces of information. In the first and second exemplary embodiments, the pattern matching operation is performed on the detection region within the expansion regions 66 and 68. Optionally, the pattern matching operation may be performed on all the detection regions within the image 50.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
    a processor configured to control the image processing apparatus to implement:
        an image retrieving unit that retrieves an image including a symbol;
        a noise detecting unit that detects individual noise candidates of the image as a detected region;
        a comparative image retrieving unit that, before noise is removed from the image, retrieves a comparative image that is to be compared with the detection region detected by the noise detecting unit; and
        a removing unit that, in accordance with comparison results of the detection region with the comparative image, removes from the image one portion of the detection region excluding the other portion of the detection region similar to the comparative image,
    wherein the comparative image retrieving unit retrieves the comparative image from a comparative image storage unit storing the comparative image indicating at least part of the symbol,
    wherein the comparative image, when being stored, is associated with information relating to a positional relationship between a position of the detection region and a position of the symbol included in the image, and
    wherein the removing unit compares the detection region with the comparative image associated with the information relating to the positional relationship between the position of the detection region and the position of the symbol included in the image.

2. The image processing apparatus according to claim 1, wherein the comparative image, when being stored, is associated with information indicating a language type to which the symbol represented by the comparative image belongs; and
    wherein the removing unit compares the detection region with the comparative image associated with the language type of the symbol included in the image.

3. The image processing apparatus according to claim 1, wherein the comparative image, when being stored, is associated with information relating to a size of the symbol represented by the comparative information; and
    wherein the removing unit compares the detection region with the comparative image that is modified in size in response to the size of the symbol included in the image.

4. The image processing apparatus according to claim 2, wherein the comparative image, when being stored, is associated with information relating to a size of the symbol represented by the comparative information; and
    wherein the removing unit compares the detection region with the comparative image that is modified in size in response to the size of the symbol included in the image.

5. The image processing apparatus according to claim 1, wherein the processor is further configured to control the image processing apparatus to implement a comparative image generating unit that generates the comparative image in accordance with the detection region,
    wherein the comparative image retrieving unit retrieves the comparative image generated by the comparative image generating unit, and
    wherein the removing unit removes, from the image, one portion of the detection region excluding the other portion of the detection region not similar to the comparative image.

6. The image processing apparatus according to claim 2, wherein the processor is further configured to control the image processing apparatus to implement a comparative image generating unit that generates the comparative image in accordance with the detection region,
    wherein the comparative image retrieving unit retrieves the comparative image generated by the comparative image generating unit, and
    wherein the removing unit removes, from the image, one portion of the detection region excluding the other portion of the detection region not similar to the comparative image.

7. The image processing apparatus according to claim 3, wherein the processor is further configured to control the image apparatus to implement a comparative image generating unit that generates the comparative image in accordance with the detection region,
    wherein the comparative image retrieving unit retrieves the comparative image generated by the comparative image generating unit, and
    wherein the removing unit removes, from the image, one portion of the detection region excluding the other portion of the detection region not similar to the comparative image.

8. The image processing apparatus according to claim 4, wherein the processor is further configured to control the image processing apparatus to implement a comparative image generating unit that generates the comparative image in accordance with the detection region,
    wherein the comparative image retrieving unit retrieves the comparative image generated by the comparative image generating unit, and
    wherein the removing unit removes, from the image, one portion of the detection region excluding the other portion of the detection region not similar to the comparative image.

9. The image processing apparatus according to claim 1, wherein the removing unit compares, with the comparative image, a portion of the detection region corresponding to the symbol included in the image.

10. The image processing apparatus according to claim 2, wherein the removing unit compares, with the comparative image, a portion of the detection region corresponding to the symbol included in the image.

11. The image processing apparatus according to claim 3, wherein the removing unit compares, with the comparative image, a portion of the detection region corresponding to the symbol included in the image.

12. A non-transitory computer readable medium storing a program causing a computer to execute a process for processing an image, the process comprising:
    retrieving an image including a symbol;

detecting individual noise candidates of the image as a detection region;
before noise is removed from the image, retrieving a comparative image that is to be compared with the detection region; and
removing, in accordance with comparison results of the detection region with the comparative image, from the image one portion of the detection region excluding the other portion of the detection region similar to the comparative image,
wherein the comparative image indicates at least part of the symbol,
wherein the comparative image, when being stored, is associated with information relating to a positional relationship between a position of the detection region and a position of the symbol included in the image, and
wherein the removing comprises comparing the detection region with the comparative image associated with the information relating to the positional relationship between the position of the detection region and the position of the symbol included in the image.

13. A method for processing an image, the method comprising:
retrieving an image including a symbol;
detecting individual noise candidates of the image as a detection region;
before noise is removed from the image, retrieving a comparative image that is to be compared with the detection region; and
removing, in accordance with comparison results of the detection region with the comparative image, from the image one portion of the detection region excluding the other portion of the detection region similar to the comparative image,
wherein the comparative image indicates at least part of the symbol,
wherein the comparative image, when being stored, is associated with information relating to a positional relationship between a position of the detection region and a position of the symbol included in the image, and
wherein the removing comprises comparing the detection region with the comparative image associated with the information relating to the positional relationship between the position of the detection region and the position of the symbol included in the image.

* * * * *